Figure 1:
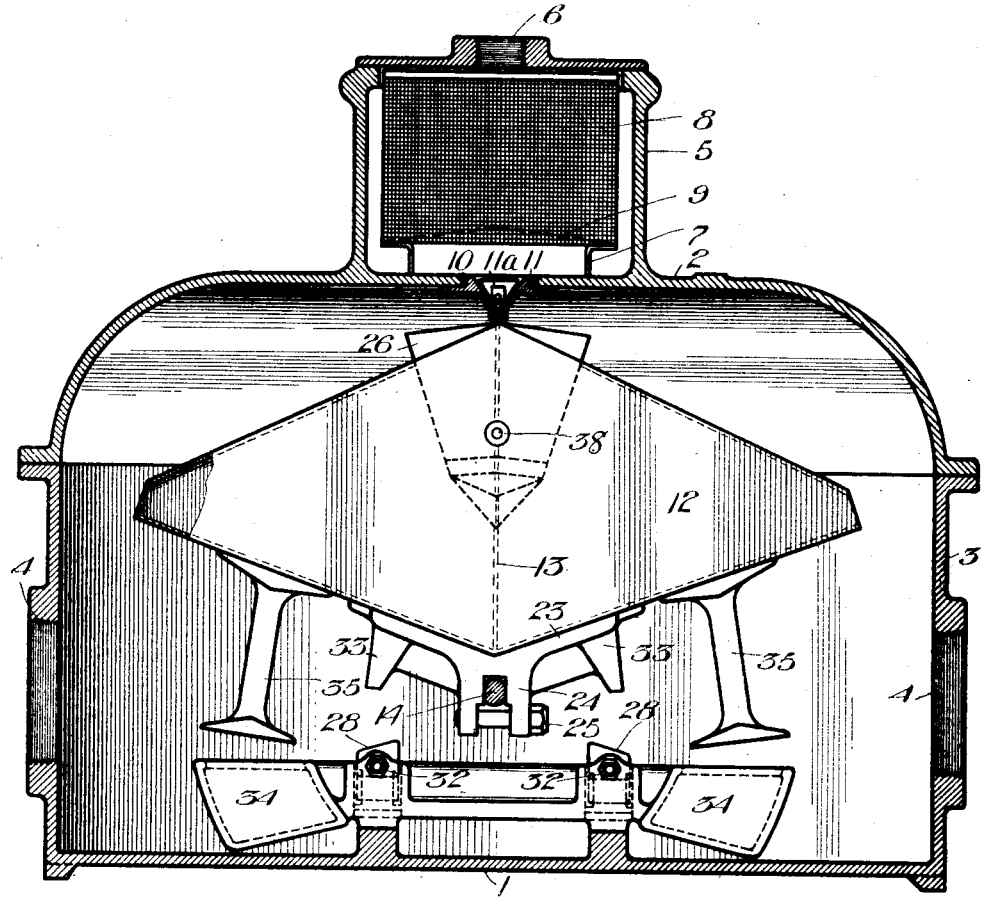

J. D. WALSH.
LIQUID MEASURING DEVICE.
APPLICATION FILED SEPT. 23, 1914.

1,197,311.

Patented Sept. 5, 1916.
4 SHEETS—SHEET 1.

WITNESSES
Burt A. Lewis
R. C. Holley.

INVENTOR
John D. Walsh
BY Edmund A. Prieuff
ATTORNEY

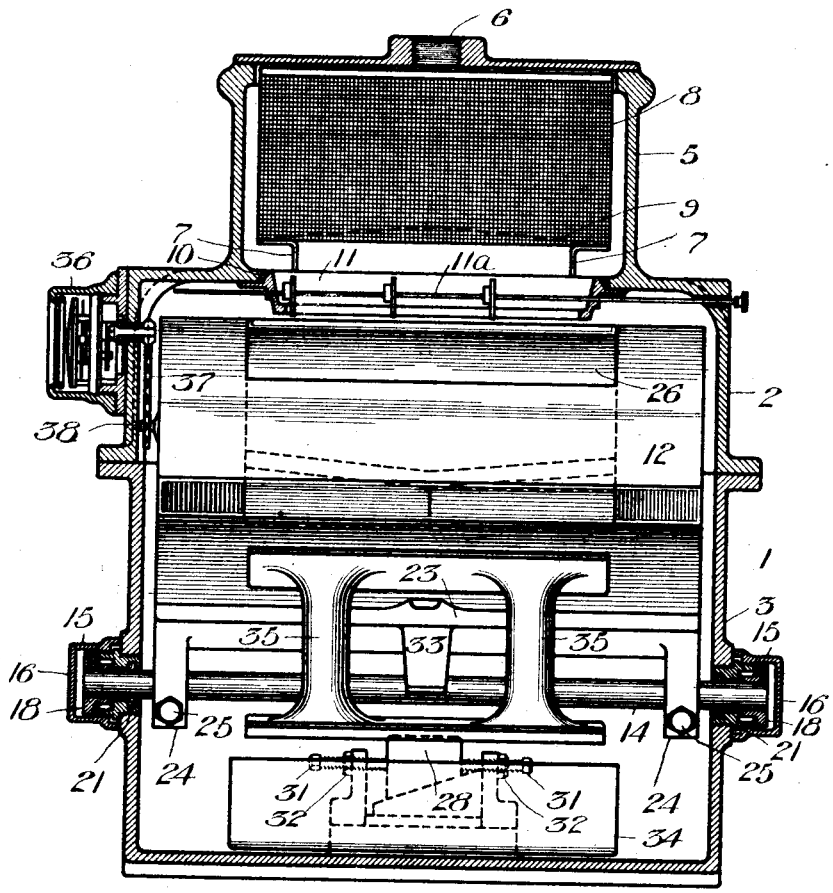

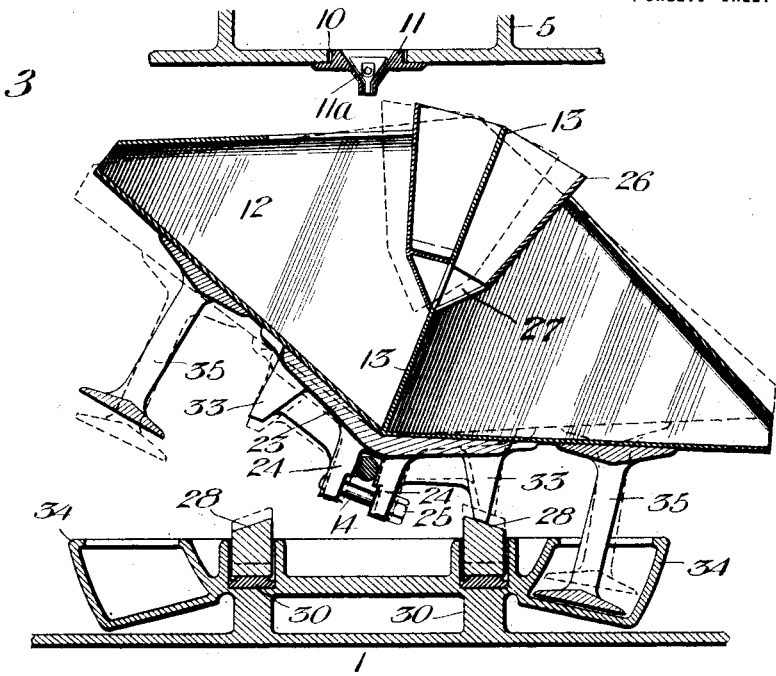
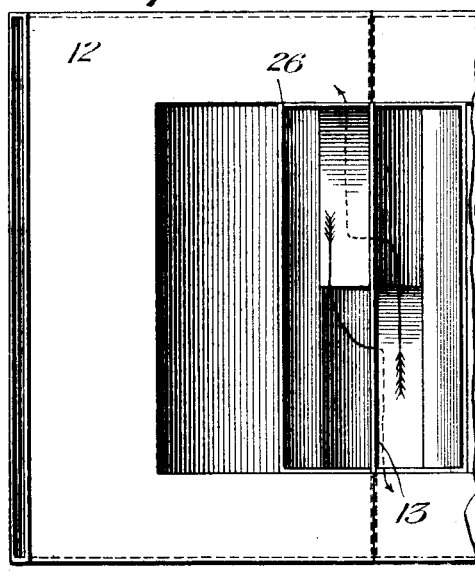
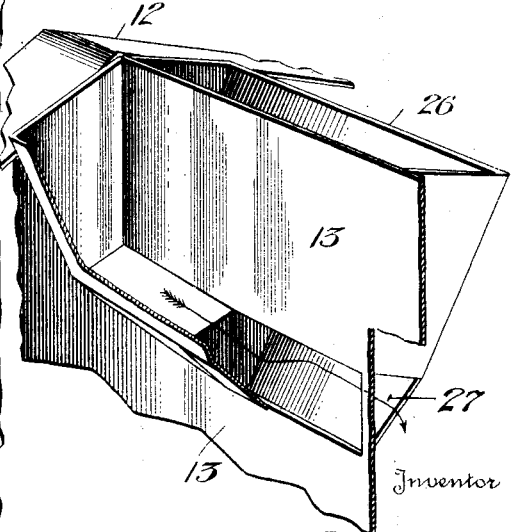

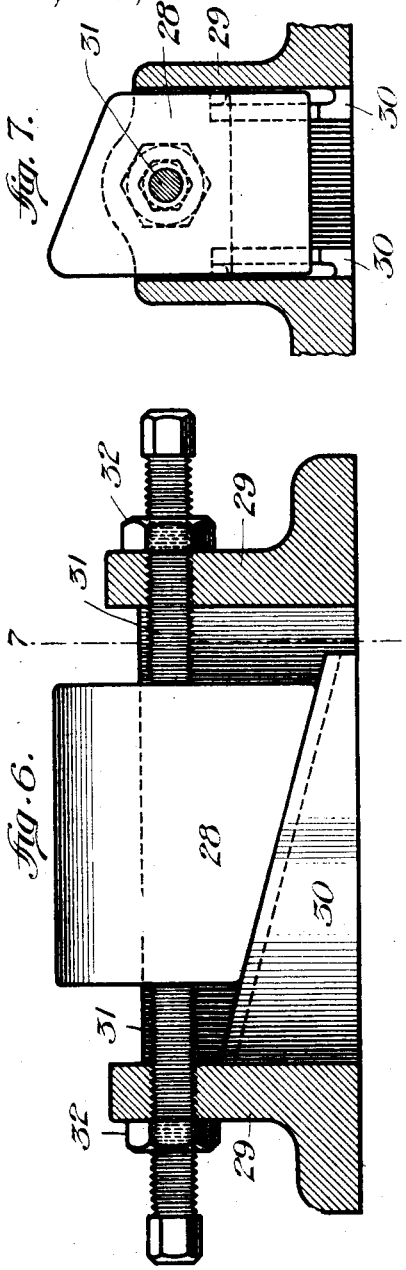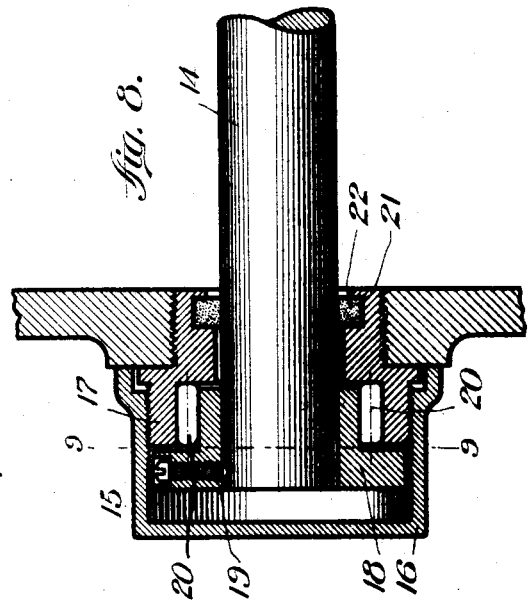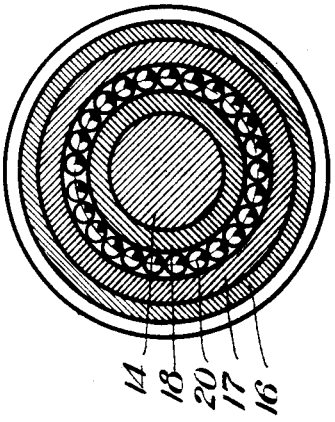

UNITED STATES PATENT OFFICE.

JOHN D. WALSH, OF NORTH TONAWANDA, NEW YORK, ASSIGNOR TO AMERICAN DISTRICT STEAM COMPANY, OF NORTH TONAWANDA, NEW YORK, A CORPORATION OF NEW YORK.

LIQUID-MEASURING DEVICE.

1,197,311.  Specification of Letters Patent.  Patented Sept. 5, 1916.

Application filed September 23, 1914. Serial No. 863,092.

*To all whom it may concern:*

Be it known that I, JOHN D. WALSH, a citizen of the United States, residing at North Tonawanda, in the county of Niagara and State of New York, have invented certain new and useful Improvements in Liquid-Measuring Devices, of which the following is a specification, reference being had therein to the accompanying drawing.

This invention relates to liquid measuring devices, and more especially to meters for measuring the water of condensation in connection with the supply of steam from a central plant.

The invention includes features constituting improvements upon the structures disclosed in my prior Patents, No. 796,883, granted August 8th, 1905, and No. 905,254, granted December 5th, 1908.

In devices of this kind, and particularly those of relatively large dimensions, it not infrequently occurs that the medium to be measured—such as water of condensation—escapes over the center-plate during the rocking motion of the measuring-bucket. In consequence, it is not measured on that particular movement of the bucket.

It is the primary object of my invention to provide a form of structure which is adapted to insure measuring of the entire quantity of fluid under all conditions.

In metering liquids by a structure which includes a rocking bucket, it is also essential that the operation thereof shall be noiseless.

It is a further object of my invention not only to provide an efficient and accurate device for measuring such liquid but, also, one which is free from jar, and wherein shocks thereto are precluded.

The invention in general seeks to provide a meter-structure which is particularly adapted for the use already specified, and which structure, from an operative standpoint, will in practical use possess a high degree of efficiency, reliability and durability, and which, structurally considered, will be of great simplicity.

Other objects and advantages will in part be obvious from the annexed drawings, while other advantages will be pointed out in the following description.

The invention resides broadly in the features of construction, in the combination of elements, and in the novel arrangement and aggroupment of parts thereof, all as will be exemplified in the construction hereinafter set forth, and the scope of application of which is indicated in the appended claims.

In order that the invention may be readily comprehended by those skilled in the art, drawings illustrating one of the many possible utilizations of the same are appended hereto as a part of this disclosure. It is manifest, and it is to be understood, that other possible utilizations and embodiments (employing the underlying principles of my invention) fall within the spirit thereof and within the objects contemplated thereby.

In the accompanying drawings: Figure 1 is a view in vertical longitudinal section of a metering-device constructed in accordance with the principles of my invention; Fig. 2 is a view in vertical transverse section thereof; Fig. 3 is a fragmentary view, in longitudinal section, showing, in full lines, the parts in one position and, in dotted lines, an adjusted position as effected by the adjusting device forming a component of my structure; Fig. 4 is a fragmentary view, in top plan, of the primary and auxiliary buckets; Fig. 5 is a fragmentary view, in perspective, of portions of the primary and secondary buckets; Fig. 6 is a fragmentary view in sectional elevation of an adjusting-device forming a part of the metering-structure; Fig. 7 is also a fragmentary view in section, on the line 7—7, Fig. 6; Fig. 8 is a fragmentary view in vertical section of one of the bearings in which the oscillating bucket is journaled; and Fig. 9 is a view in vertical section on the line 9—9, Fig. 8.

Referring to the drawings, it will be noted that the reference-numeral 1 designates a casing, which may be of any appropriate form and dimensions. It preferably includes top and bottom-sections, 2 and 3, respectively. The bottom-section, at its opposite ends, is provided with outlet-ports 4 into which is to be threaded piping that leads to a suitable point of discharge. The upper section is preferably provided with a screen-containing housing 5 provided, by preference, with an inlet-port 6. Supported within the housing in any suitable manner, as by the standards 7, is a screen-member 8 which, preferably and as shown, is box-like in form and open at its top to receive the inflow of liquid from the port 6.

Disposed within the screen, adjacent its bottom, is a perforated spreader-member 9, which covers the entire area bounded by the screen. Its function is to distribute the water in such manner that no injurious effect, due to the sudden inrush of a large volume of water, will result to the other components of the meter. It also coöperates with the screen to prevent foreign matter, such as scale or core-sand, from entering the meter.

The casing-section 2, at a point beneath the screen-member 8, is provided with a port 10 in which is seated a slotted directing-member 11 adapted to deliver fluid from the housing 5 into the casing 1. Means, such as the sliding member 11ᵃ, may be provided for displacing accumulated foreign matter in said member 11.

Mounted to oscillate or rock within the casing 1 is a liquid-receiving member 12 which may be of any preferred form and dimensions and which (in this instance) is shown as a primary measuring-bucket, open at its ends, and provided with a center-plate 13 which divides the bucket centrally into two sections or compartments. This primary measuring-bucket may be supported within the casing in any desired manner. I prefer, however, to mount it upon a shaft 14 journaled at its opposite ends in bearings designated, generally, by 15. Each bearing includes a cap 16 which is, by a screw-threaded connection, carried by an outer race-member 17 screwed into the side of the casing. Its companion race-member 18 is attached, as by the screw 19, to the shaft. Tracking upon the surfaces of the race-members is a series of rollers 20. The race-member 17 is provided with a groove 21 in which is disposed a washer 22, preferably of felt, the function of which is to prevent any scale or core-sand that may have entered the casing from being introduced into the bearing.

Any convenient means for attaching the bucket to the shaft may be employed; but, from actual experience, it has been found that that which is herein disclosed is highly practical and very efficient. It includes a saddle-member 23 secured to the under-surface of the bucket 12 and provided adjacent its ends with two yoke-portions 24 through each of which extends a bolt 25 adapted to effect a holding engagement of the members of the yoke with the supporting shaft, which, at this portion, is preferably flattened at its sides, as shown. Heretofore, where this type of primary bucket has been employed, it has sometimes happened that, after the center-plate 13 (which divides the bucket into compartments) has moved to one side of the vertical line passing through the opening in the directing plate 11, the liquid would discharge into the compartment which is then to be filled, whereas, it should discharge into the compartment which is then to discharge.

In discharging into the wrong compartment it is not measured in its proper compartment. This has reduced the accuracy of measurement. As an effective and convenient means for preventing this, an auxiliary bucket 26 is suitably attached to the center-plate 13 and which divides it into two compartments, also. The function of this auxiliary bucket is to receive and direct that liquid which would otherwise pass into the compartment then to be filled, into the compartment which is then to empty. The auxiliary bucket is provided with directing-channels 27 which extend through the center-plate, so that the one which is on the left-side, say, of the center-plate 13 discharges into the right-hand compartment of the primary bucket, while the other discharges into the left-hand compartment thereof. Thus, any water which is collected in the auxiliary bucket will pass through its proper directing-channel and into its respective compartment in the primary bucket where it is measured in the next bucketful.

As the bucket must have a predetermined rocking movement to position one or another of its compartments so that it will receive incoming liquid and simultaneously discharge liquid from the opposite portion of the bucket, means are provided for limiting such movement. In this instance, such means include a bumper-member 28 adjustably disposed between brackets 29 upstanding from the bottom of the casing-section 3 and sustained by a supporting-block 30 formed thereon. As shown particularly in Fig. 6, the block 30 is beveled, as is the bumper-member 28. The latter is maintained against sidewise movement in either direction by adjusting-screws 31 which are prevented from turning by binding-nuts 32. It will be seen that by adjusting the screws 31, the block 30 may be positioned so that its upper surface will be disposed in a higher or lower plane, as may be desired. Such adjustment effects the proper positioning of the auxiliary bucket with reference to the directing plate 11. The upper surface of each of the bumpers is inclined toward the axial line of the shaft 14, and is adapted to be engaged by a pendant-projection 33 formed on the saddle-member 23.

As will be seen, on an inspection of Fig. 1, the bucket 12 is in a neutral position. When one of its compartments has been filled with a predetermined quantity of water, the bucket will rock on its axis, constituted by the shaft 14, and this will cause the pendant projection 33 to engage the inclined surface of the bumper-member 28. To vary the extent of rocking movement of the bucket 12 and, thus, to effect proper relative positioning of the auxiliary bucket, the bumper-members 28 are adjusted in the manner already explained.

To cushion the bucket, when it rocks in one or the other direction, a device is provided which, in this instance, is similar to that disclosed in my aforementioned patents, and includes dash-pots 34 adapted to contain water. Each pot is so disposed as to be in the path of movement of its respective plunger 35.

Arranged on the casing, as shown in Fig. 2, is a registering or counter-device 36 which is adapted to be operated by a two-armed actuator 37 adapted to be engaged by a stud 38 mounted on one side of the bucket 12.

Operation: The operation of the device, as thus disclosed, will be obvious. The liquid, entering through the port 6, passes into the housing 5 and, having therein been screened and distributed by the members 8 and 9, as already described, passes into the raised compartment of the primary bucket, through the opening beyond the auxiliary bucket. When the latter rocks on its axis, it discharges its contents into the lower portion of the casing. From this, the contents pass out through the ports 4. Each oscillation of the bucket operates the registering device. As the level of the lower portion of the ports 4 corresponds to the upper portions of the dash-pots 34, the liquid in the latter will be maintained so as to be impinged by the plunger 35 and cushioning of the bucket effected. The auxiliary bucket 26 subserves the function of receiving and directing any liquid that would otherwise escape into the compartment that is then to be filled, and discharges it through the center-plate 13 during the oscillating movement of the primary bucket. When the primary bucket tilts, its action is rapid until the plunger reaches the dash-pot; thus the auxiliary bucket on the side which is emptying will be swept under the inlet opening quickly and receive practically no liquid. The auxiliary buckets are so arranged, however, that when the plunger on one side of the primary bucket is entering its dash-pot, the auxiliary bucket on the opposite side of the dividing plate will be directly under the inlet opening. It remains there, deflecting the liquid into the compartment of the primary which is emptying, until the plunger is almost seated in the bottom of the dash-pot. When this point is reached, the tilting movement has caused the auxiliary to pass beyond the inlet opening and the liquid drops into the compartment of the primary then to be filled. In order to adjust the outermost wall of the auxiliary bucket in relation to the directing member 11, to secure accurate results, the adjustable bumpers are shifted and set, as already described.

From the foregoing, it will be perceived that I have succeeded in devising a meter-structure which is well adapted to achieve the objects and ends in view. The structure is simple and compact in form, and the parts of which it is formed are so constructed as to insure a great accuracy and efficiency, and this is essential in this type of device.

As many changes in the construction and many widely different embodiments of the invention can be made without departing from the spirit thereof, it is intended that all matter contained in the foregoing description and shown in the accompanying drawings shall be interpreted as illustrative and not in a limiting sense. It is also to be understood that the language used in the following claims is to cover all features of the invention, both generic and specific.

What I claim is:

1. A metering device comprising an oscillating primary bucket; an auxiliary bucket mounted on and movable with said primary bucket; a partition dividing said buckets into oppositely disposed compartments; and a directing channel connecting a compartment in the auxiliary bucket with an oppositely-disposed compartment in the primary bucket.

2. A metering device comprising an oscillating primary bucket; a secondary bucket connected to and movable with said primary bucket; a plurality of compartments in the primary bucket; and a compartment in the secondary bucket opening directly into a compartment of the primary bucket.

3. A metering-device comprising a casing having inlet and outlet-ports, an oscillating measuring-bucket mounted in the casing, means for predetermining the extent of movement of the bucket including a supporting-block and a bumper-member adjustably disposed thereon, and means movable at the will of the operator to adjust said bumper-member on the supporting-block and thereby change the extent of movement of the bucket and including a plurality of adjusting-screws normally in engagement with the sides of the bumper-member.

4. A metering-device comprising a casing having inlet and outlet-ports, an oscillating measuring-bucket mounted in the casing, means for predetermining the extent of movement of the bucket including a supporting-block and a bumper-member adjustably disposed thereon, and means for supporting said bucket for accurate movement in the casing including a saddle-member having a yoke-portion, a shaft embraced by the yoke-portion, and means for clamping the yoke-portion to the shaft.

5. A metering-device comprising a casing having inlet and outlet-ports, an oscillating measuring-bucket mounted in the casing, means for predetermining the extent of movement of the bucket including a supporting-block and a bumper-member adjustably disposed thereon, and means for supporting the bucket in the casing for accurate movement therein including a shaft journaled in the casing, a saddle-member secured to the bucket and provided with yoke-portions adapted to the shaft, and bolts extending through the members of the yoke and clamping the same to the shaft.

6. A meter comprising a casing, an oscillating measuring-bucket disposed therein, means for predetermining the extent of movement of the bucket including two components adjustable one on the other, and means for suspending the bucket in the casing for a rocking movement therein including a shaft secured to the bucket, and a bearing device at each end of the shaft comprising juxtaposed rack-members secured to the casing and shaft, respectively, one of said members being provided with an annular groove, and a felt washer therein for excluding foreign matter from the bearing.

7. A liquid-measuring device, comprising a casing provided with an inlet-port, an oscillating measuring-bucket disposed therein, means for varying the extent of movement of the bucket, the casing being formed with a housing overlying the bucket, a screening structure disposed in the housing, and a spreader-member in the screening structure adapted to effect a more even distribution of inflowing liquid into the underlying bucket.

8. A liquid-measuring device, comprising a casing provided with an inlet-port, an oscillating measuring-bucket disposed therein, means for varying the extent of movement of the bucket including a supporting-block, a sliding bumper-member thereon, and adjusting screws for shifting the member on the block, the casing being formed with a housing overlying the bucket, a screening structure disposed in the housing, and a spreader-member in the screening structure adapted to effect a more even distribution of inflowing liquid into the underlying bucket.

9. A liquid-measuring device, comprising a casing provided with an inlet-port, an oscillating measuring-bucket disposed therein, means for varying the extent of movement of the bucket including a supporting-block, a sliding bumper-member thereon, and adjusting screws for shifting the member on the block, means for supporting the bucket in the casing for accurate movement therein including a shaft journaled in the casing, a saddle-member secured to the bucket and provided with yoke-portions adapted to the shaft, and bolts extending through the members of the yoke and clamping the same to the shaft, the casing being formed with a housing overlying the bucket, a screening structure disposed in the housing, and a spreader-member in the screening structure adapted to effect a more even distribution of inflowing liquid into the underlying bucket.

10. A liquid-measuring device, comprising a casing provided with an inlet-port, an oscillating measuring-bucket disposed therein, means for varying the extent of movement of the bucket including a supporting-block, a sliding bumper-member thereon, and adjusting screws for shifting the member on the block, means for supporting the bucket in the casing for accurate movement therein including a shaft journaled in the casing, a saddle-member secured to the bucket and provided with yoke-portions adapted to the shaft, and bolts extending through the members of the yoke and clamping the same to the shaft, and a bearing-device at each end of the shaft comprising juxtaposed rack-members secured to the casing and shaft, respectively, one of said members being provided with an annular groove, a felt washer therein for excluding foreign matter from the bearing, the casing being formed with a housing overlying the bucket, a screening structure disposed in the housing, and a spreader-member in the screening structure adapted to effect a more even distribution of inflowing liquid into the underlying bucket.

11. A metering-device comprising a casing having inlet and outlet-ports, an oscillating primary measuring bucket mounted in the casing and adapted to receive liquid from the inlet-port and discharge the same in proximity to the outlet-port, an auxiliary liquid-directing bucket carried by the primary bucket, a directing member juxtaposed to the buckets and adapted to discharge liquid thereinto, and means for adjusting the buckets to position the walls of said auxiliary bucket in predetermined relation to the liquid-directing member.

12. A metering-device comprising a casing, an oscillating primary measuring bucket mounted therein, an auxiliary directing bucket connected to and movable with the primary bucket, a liquid-directing member juxtaposed to said bucket, and means disposed in the path of movement of said buckets for arresting their movement whereby the walls of the auxiliary bucket are adjustably positioned in predetermined relation to said directing member.

13. A metering-device including a casing, an oscillating primary measuring bucket mounted therein and having a plurality of spaced-apart compartments, an auxiliary bucket connected to and movable with the primary bucket and also having a plurality of spaced-apart compartments and directing channels extending from the compartments in the auxiliary bucket to oppositely disposed compartments in the primary bucket, a directing member juxtaposed to said buckets, and adjustable means for limiting the movement of the buckets to predetermine the position of the walls of the auxiliary bucket in relation to the directing member.

14. A metering-device including a casing, an oscillating primary measuring bucket mounted therein, a partition in the bucket dividing the same into two liquid-receiving compartments, an auxiliary bucket supported upon said partition and divided thereby into two compartments and having directing channels extending from its compartments through said partition into the compartments oppositely-disposed at each side of said partition in the primary bucket, a directing member juxtaposed to said bucket-dividing partition, and means interposed between a portion of said casing and said buckets for changing the extent of movement thereof, whereby the outlying walls of the auxiliary bucket are positioned in predetermined relation to said directing member.

In testimony whereof I affix my signature in presence of two witnesses.

JOHN D. WALSH.

Witnesses:
BURT A. LEWIS,
R. C. HOLLEY.

Copies of this patent may be obtained for five cents each, by addressing the "Commissioner of Patents, Washington, D. C."